United States Patent
Zampetti et al.

(10) Patent No.: US 8,594,134 B2
(45) Date of Patent: Nov. 26, 2013

(54) PRECISION TIME TRANSFER OVER OPTICAL FIBER

(75) Inventors: George P. Zampetti, Livermore, CA (US); Sanjay Mani, Los Altos Hills, CA (US)

(73) Assignee: Symmetricom, Inc., San Jose, CA (US)

( * ) Notice: Subject to any disclaimer, the term of this patent is extended or adjusted under 35 U.S.C. 154(b) by 397 days.

(21) Appl. No.: 12/835,586

(22) Filed: Jul. 13, 2010

(65) Prior Publication Data
US 2011/0299853 A1 Dec. 8, 2011

Related U.S. Application Data

(60) Provisional application No. 61/350,868, filed on Jun. 2, 2010.

(51) Int. Cl.
*H04J 3/06* (2006.01)

(52) U.S. Cl.
USPC .......................................................... 370/503

(58) Field of Classification Search
USPC .................. 370/503–520, 907; 375/354–371; 709/203, 208, 248; 713/375, 400, 401, 713/500
See application file for complete search history.

(56) References Cited

U.S. PATENT DOCUMENTS

| | | | |
|---|---|---|---|
| 7,126,800 B2 * | 10/2006 | Premerlani et al. | 361/68 |
| 7,382,845 B1 | 6/2008 | Shenoi | |
| 7,535,931 B1 | 5/2009 | Zampetti et al. | |
| 7,689,854 B2 * | 3/2010 | Ilnicki et al. | 713/400 |
| 8,018,972 B2 * | 9/2011 | Roberts et al. | 370/507 |
| 2005/0144309 A1 * | 6/2005 | Gish | 709/233 |
| 2009/0245802 A1 * | 10/2009 | Bugenhagen | 398/98 |

OTHER PUBLICATIONS

Lee, An Enhanced IEEE 1588 Time Synchronization Algorithm for Asymmetric Communication Link using Block Burst Transmission, IEEE, 3 pages, 2008.*
"Data-Over-Cable Service Interface Specifications—Modular-CMTS," DOCSIS Timing Interface Specification, CM-SP-DTI-I01-050805, Aug. 2005.
"Timing Interface for Cable Modem Termination Systems," ITU-T Recommendation J.211, Nov. 2006.
"Synchronization of Network Packets—Technical Report," ATIS Standard ATIS-0900001 (2008).
IEEE Std. 1588-2008, "IEEE Standard for a Precision Clock Synchronization Protocol for Networked Measurement and Control Systems," 2008.
"Network Time Protocol (Version 3)—Specification, Implementation and Analysis," RFC 1305, Internet Engineering Task Force (IETF), Mar. 1992.
Shenoi, Kishan. "Synchronization and Timing in Telecommunications," ISBN 1-4392-2632-6, Ch. 2, Sec. 2.3, pp. 39-69 (2009).

* cited by examiner

*Primary Examiner* — Frank Duong
(74) *Attorney, Agent, or Firm* — Patterson & Sheridan LLP

(57) ABSTRACT

A clock at a first network element that is connected to a second network element over an optical fiber link is aligned using bursts of timing information exchanged between the two network elements. According to one method, the bursts from the first network element to the second network element and the bursts from the second network element to the first network element are transmitted over the same wavelength channel of the optical fiber link, in which case zero asymmetry in the transit delays can be assumed during the alignment procedure. According to another method, the bursts from the first network element to the second network element and the bursts from the second network element to the first network element are transmitted over different wavelength channels of the optical fiber link, in which case the asymmetry in the transit delays can be quantified and applied during the alignment procedure.

25 Claims, 7 Drawing Sheets

PRECISION TIME TRANSFER OVER OPTICAL FIBER

CROSS-REFERENCE TO RELATED APPLICATIONS

This application claims the benefit of U.S. Provisional Patent Application 61/350,868, filed Jun. 2, 2010, the entire contents of which are incorporated by reference herein.

BACKGROUND OF THE INVENTION

1. Field of the Invention

Embodiments of the present invention relate generally to time and frequency alignment systems operating over digital communications networks and, more specifically, to methods and apparatus for precision time transfer over optical fiber.

2. Description of the Related Art

It has been recognized that synchronizing network elements in optical communications networks to a high level of precision enables the provision of advanced services. Consequently, time and frequency alignment are essential to certain types of systems operating in conventional optical networks. For example, accurate time alignment is required by instrumentation systems gathering data at specific time intervals, services carried out in real time over a network, and network elements that use packet-based signal formats for multiplexing, transmission, and switching. Similarly, frequency alignment is required in time-division multiplexing (TDM) and media streaming systems that require fixed video or audio sample rates across multiple clients.

One approach known in the art that provides both time and frequency alignment involves computing an aligned time signal based on a master timing signal from a primary reference clock, such as a global positioning system (GPS) satellite timing signal, which is held in precise alignment with a global clock reference. Using GPS signals or other master timing signals at each network element to achieve time or frequency alignment is generally prohibitively expensive and requires each network element to be able to receive satellite time signals from GPS satellites. In addition, there are many situations where visibility of GPS satellites may be compromised or interrupted. Consequently, a more cost-effective approach to time alignment is to transmit timing alignment information via a protocol that is operable within a given communications network.

In conventional TDM networks a physical layer method implements frequency alignment throughout the network, starting with a designated master clock system. The designated master clock system delivers frequency and/or timing information via bit-timing and/or symbol-timing information associated with downstream physical communication links. In normal operation, each network element coupled to the master clock system regenerates and distributes the master clock timing information to neighboring downstream network elements in a point-to-point fashion over the physical medium interconnecting adjacent network elements. Thus, each network element within the TDM network receives frequency and/or timing information and aligns local frequency and/or timing with an upstream clock reference, thereby enabling every network element within the TDM network to achieve frequency alignment. Provided that adequate care is taken to avoid timing loops, such a configuration has been proven to be robust. However, the timing reference transferred between elements in the TDM environment is principally'a frequency reference as opposed to a time reference.

Packet-based methods such as Precision Time Protocol (PTP) and Network Time Protocol (NTP) transfer time and frequency references using packets containing time stamps that identify the times of departure/arrival of packets. PTP and NTP can distribute timing and frequency alignment throughout a network in a point-to-point fashion similar to the way that TDM networks distribute frequency alignment, as described above. PTP and NTP can also operate in a mode where the "slave" clock in a network element can communicate directly with the "master" clock system for timing purposes. In either case, the accuracy of such two-way time-transfer protocols is adversely affected by packet delay variation introduced by the intervening network elements and optical links. PTP and NTP assume that transit delays between master and slave clocks are symmetric, i.e., the transfer packet delay from a master clock to a slave clock is equal to the transfer packet delay from the slave clock to the master clock. But because of the fundamental statistical behavior of packet networks, the transit delays are not fixed and can vary from packet to packet or with direction of data transmission, i.e., master-to-slave transmissions versus slave-to-master transmissions. Specifically, the asymmetry in transit delay of timing packets between slave and master clocks provides a statistical bound to the accuracy of time transfer.

Also, packet-based methods like PTP and NTP often use separate fiber strands and/or fiber wavelengths for carrying signals in each direction, i.e., slave-to-master and master-to-slave, and assembly and deployment methods of communication networks often include short lengths of cable for mounting convenience that vary each path length between network elements by an unknown amount. The asymmetry in transit delay resulting from such variation in path length can be tens of nanoseconds or more, while the desired level of time accuracy and time stability in a fiber-optic communication network can be on the order of nanoseconds. Thus, the ability of PTP and NTP to accurately transfer time between network elements in a fiber-optic network is limited.

SUMMARY OF THE INVENTION

Embodiments of the present invention provide methods for synchronizing a clock at a first network element that is connected to a second network element over an optical fiber link. Bursts of timing information are exchanged between the two network elements and the clock at the first network element is aligned using the timing information contained in the bursts. In one embodiment, the bursts from the first network element to the second network element and the bursts from the second network element to the first network element are transmitted over the same wavelength channel of the optical fiber link. In another embodiment, the bursts from the first network element to the second network element and the bursts from the second network element to the first network element are transmitted over different wavelength channels of the optical fiber link.

According to other embodiments of the present invention, transit delays through an optical fiber link that connects a client and a server are determined based on timing information transmitted between the client and the server and an asymmetry in the transmission speeds through the optical fiber link. In one embodiment, the asymmetry is determined using clocks at both the client and the server that have been corrected with an accurate timing reference. In another embodiment where the timing information is transmitted from the server to the client along a first wavelength channel and from the client to the server along a second wavelength channel, the asymmetry is determined based on differences in transmission speeds of the first and second wavelength channels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
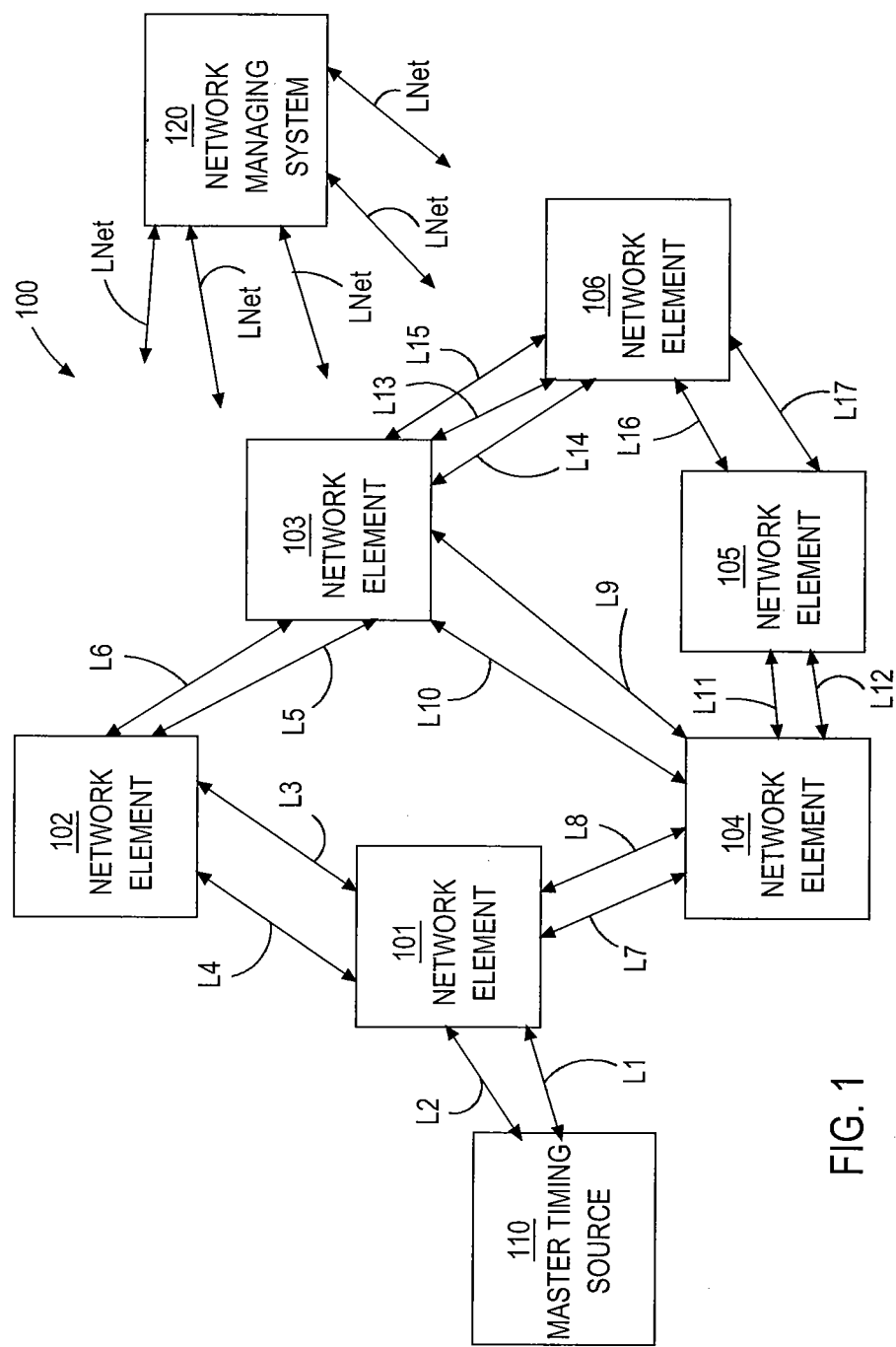
FIG. 1 illustrates a network of network elements configured to implement one or more aspects of the present invention.

FIG. 1 illustrates a network 100 of network elements 101-106 configured to implement one or more aspects of the present invention. Network 100 is an optical communication network that includes network elements 101-106, a master timing source 110, and a network managing system 120. Master timing source 110 is a time reference for network 100, such as a timing source coupled to a global positioning system (GPS) time receiver or atomic clock, and provides a time and/or frequency reference for network 100. Network elements 101-106 may be nodes of network 100, such as optical switches or routers, and are linked as shown by optical links L1-L17. Network managing system 120 represents the functionality of a network management system, i.e., a central location, either physical or logical, where information for a region of the network is collected, collated, parsed, and interpreted, and from which configuration, provisioning, control, and similar information is delivered to the network elements comprising the region. Network managing system 120 is coupled to master timing source 110 and network elements 101-106 via network management links LNet. Each of network elements 101-106 includes a clock, to which embodiments of the invention deliver a suitable time and/or frequency reference that may be considered either a master clock or a slave clock, depending on whether the associated network element is distributing or receiving a time and/or frequency reference. Thus, according to embodiments of the invention, a suitable time and/or frequency reference may be delivered to each of network elements 101-106 in the same manner, so that ultimately all elements of network 100 are synchronized to a common reference within a specified accuracy, e.g., on the order of nanoseconds.

Transit delay asymmetry is defined as the direction-dependent difference in transit time for information transmitted between two network elements. In other words, transit delay asymmetry is the difference between the transit time for information traveling from a first network element to a second network element and the transit time for information traveling from the second network element to the first network element. Because such asymmetry is common in optical networks, time synchronization standards that assume that no transit delay asymmetry exists between network elements, such as Precision Time Protocol (PTP) and Network Time Protocol (NTP), have significantly reduced accuracy in optical networks. DTI is a precise synchronization standard known in the art that uses a two-way time-transfer protocol to transfer frequency and/or timing information over category 5 cable from an upstream clock reference to network elements. Transit delay asymmetry between network elements is eliminated by DTI in category 5-based networks since traffic in each direction between network elements is sent via the same path alternately with a "ping-pong" protocol. By sending such traffic along a symmetric path, the clocks contained in the communication network elements can be very precisely synchronized. However, traditional DTI protocol is only suitable for communication networks having relatively short distances between the network elements contained therein, e.g., 200 to 300 meters, and therefore has not been applied to optical networks having distances between network elements exceeding 10 kilometers. Embodiments of the invention described here can advantageously utilize features of the DTI signal structure and frame format in an optical network application.

According to embodiments of the invention, when network 100 is in operation the transit delay asymmetry of an optical link between two network elements is determined to synchronize clocks embedded in each network element. The transit delay asymmetry for any other optical links between the same two network elements can then be quantified using the synchronized clocks. This process is repeated for the remaining network elements, so that transit delay asymmetry is known for each optical link in the network. As a result, time synchronization standards that assume that no transit delay exists between network elements, such as PTP and NTP may be used provided time transfers between network elements are corrected accordingly based on the known transit delay asymmetry for each optical link in the network. Alternatively, according to some embodiments, transit delay asymmetry of an optical link between two network elements is substantially eliminated by carrying traffic between two network elements over symmetric paths. In such embodiments, PTP, NTP, and similar time synchronization standards may be used effectively.

Figure 2:
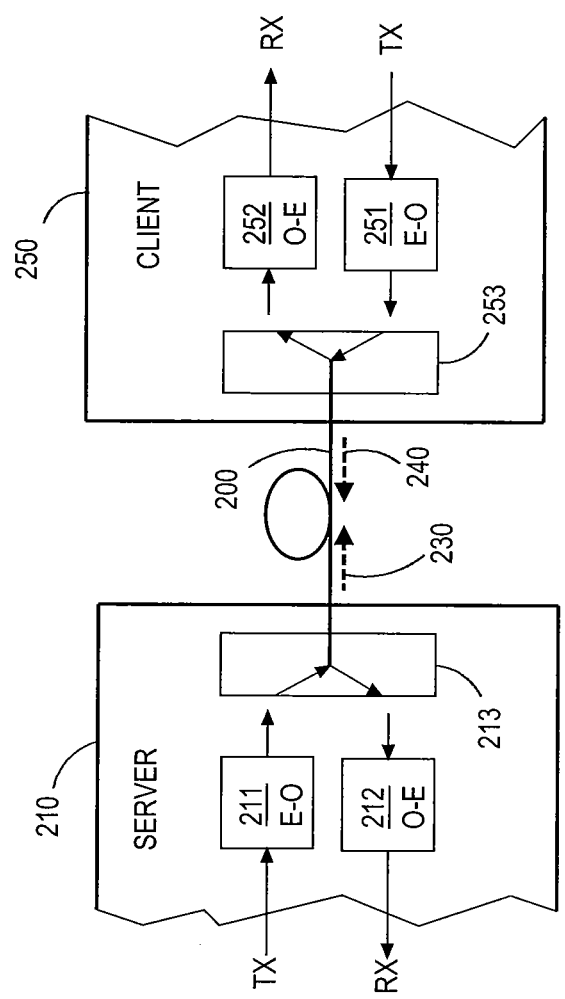
FIG. 2 schematically illustrates the physical layer connection between a server and a client in a network.

FIG. 2 schematically illustrates the physical layer connection 200 between a server 210 ("master") and a client 250 ("slave") in network 100. As noted above, each of network elements 101-106 includes a clock that may be considered either a master clock or a slave clock, depending on whether the associated network element is distributing or receiving a time and/or frequency reference. For example, when network element 101 is transferring a timing and/or frequency reference signal to network element 102, network element 102 acts as client 250 and network element 101 acts as server 210. Physical layer connection 200 includes a fiber-optic cable that includes one or more optic fibers. E-O modules 211, 251 convert signals from an electrical format to an optical format. O-E modules 212, 252 convert signals from an optical format to an electrical format. Splitter/combiner modules 213, 253 couple the TX signals to a fiber in physical layer connection 200 and extract RX signals from a fiber in physical layer connection 200.

In one embodiment, server-to-client signals 230 and client-to-server signals 240 are carried over different paths with respect to transmission delay. For example, the identical optical fiber may be used for both server-to-client signals 230 and client-to-server signals 240, but since server-to-client signals 230 are implemented with one light wavelength and client-to-server signals 240 are implemented with another, propagation delay, and therefore the path, for each is asymmetric. This is because the index of refraction of an optic fiber, and hence the transmission speed, varies as a function of wavelength. Alternatively, separate optical fibers may be used to carry server-to-client signals 230 and client-to-server signals 240. In such an embodiment, the resulting transit delay asymmetry produced by these different paths is calibrated and compensated for in order to enable the use of time synchronization standards in network 100 that assume that no transit delay exists between network elements, such as PTP and NTP. Calibration and compensation for transit delay asymmetry produced when server-to-client signals 230 and client-to-server signals 240 are carried over different paths is described below in conjunction with FIG. 7.

In another embodiment, server-to-client signals 230 and client-to-server signals 240 are carried over essentially identical paths with respect to transmission delay. For example, the identical optical fiber strand and the same light wavelength may be used for both server-to-client signals 230 and client-to-server signals 240 for transferring a time and/or frequency reference. In such an embodiment, a "ping-pong" protocol is used so that only server-to-client signals 230 or client-to-server signals 240 are carried over the optical fiber at any time. Thus, the communication between server 210 and client 250 is achieved using burst mode communications. Specifically, in a given timeslot, such as a "DTI Timeslot" when using the DTI protocol, server 210 sends a burst of information and client 250 responds with a burst of information. Each burst of information includes a preamble, the payload, and a cyclic redundancy checksum (CRC). A pre-determined turnaround guard time is engineered so that there is never an overlap in time of server-to-client signals 230 and client-to-server signals 240 in the two directions, thereby allowing the communication between server 210 and client 250 to be accomplished over a single cable in a "ping-pong" fashion. Consequently, communication between server 210 and client 250 is over the same medium in both directions and therefore there is essentially zero asymmetry in transmission time for server-to-client signals 230 and client-to-server signals 240. Such an embodiment employing symmetric paths for server-to-client signals 230 and client-to-server signals 240 is described in greater detail below in conjunction with FIGS. 5 and 6.

Figure 3:
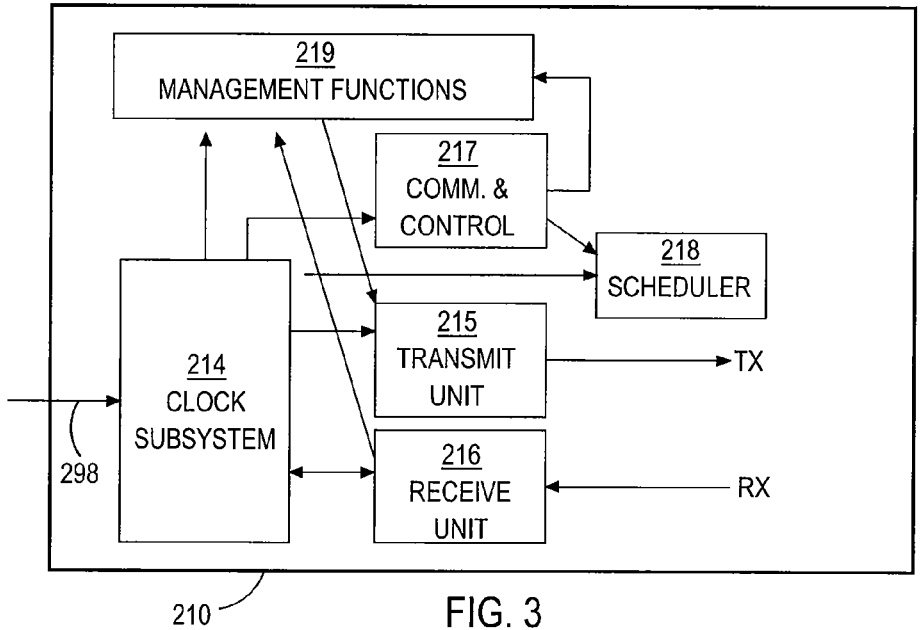
FIG. 3 schematically illustrates the principal components and functions of a server of FIG. 2.

FIG. 3 schematically illustrates the principal components and functions of server 210. Server 210 includes a clock subsystem 214, a transmit unit 215, a receive unit 216, a communication and control module 217, a scheduler module 218, and a management functions module 219.

Clock subsystem 214 includes the functionality of accepting a time/frequency reference 298 from an external reference, such as master timing source 110 or an "upstream" network element in network 100. The time/frequency reference determines the timescale to be used by server 210 and its subtending clients. In the embodiment illustrated in FIG. 2, the only subtending client of server 210 is client 250; however other clients 250 may also exist in other embodiments. Clock subsystem 214 establishes the timescale and may have additional functions such as holdover, to account for periods of time when the reference is missing or unusable. A single clock subsystem 214 may be used to support multiple ports, i.e., multiple pairs of transmit unit 215 and receive unit 216, although for clarity, only one such pair is depicted in FIG. 3. Clock subsystem 214 also generates the requisite clock signals to clock data out of transmit unit 215, determines the time of arrival of received bursts, and provides the timing information to schedule transmit bursts and the time stamp required for the transmit payload.

Transmit unit 215 generates a transmit signal TX comprising the payload and preamble. Transmit unit 215 accepts the content of payload from communication and control module 217 and the time-of-departure of the transmitted burst is determined by scheduler module 218. Receive unit 216 establishes the time-of-arrival of the signal burst received from client 250. The payload information is provided to the communication and control module 217 for parsing and subsequent processing.

Communication and control module 217 represents the functionality related to generating the payload information for transmission and processing of payload information that is received. Communication and control module 217 also determines the precise time-of-departure of the signal burst from transmit unit 215.

Scheduler module 218 is often incorporated inside other blocks in a distributed fashion but is identified separately because of its importance. According to embodiments of the invention, the use of time synchronization standards that assume that no transit delay exists between network elements, e.g., PTP, or NTP, can be effectively used in network 100. This is because scheduler module 218 controls the time-of-departure such that the embedded time stamp is "on-time" and accurate at the instant the burst reaches the client. Thus, the time stamp included in the payload by communication and control module 217 is advanced from the actual time the TX burst leaves server 210, where the amount the time stamp is advanced is based on the transit delay asymmetry measured between server 210 and client 250.

Management functions module 219 represents the traditional operations, maintenance, alarm, and provisioning (OMAP) functions associated with telecommunications equipment. In addition, the management functionality in a DTI server can include the monitoring of all the clients connected to a server and serve as a conduit for management information emanating from, and directed to, a client to/from a higher-level network management entity. This communication channel is provided by the payload in the burst communication signal.

Figure 4:
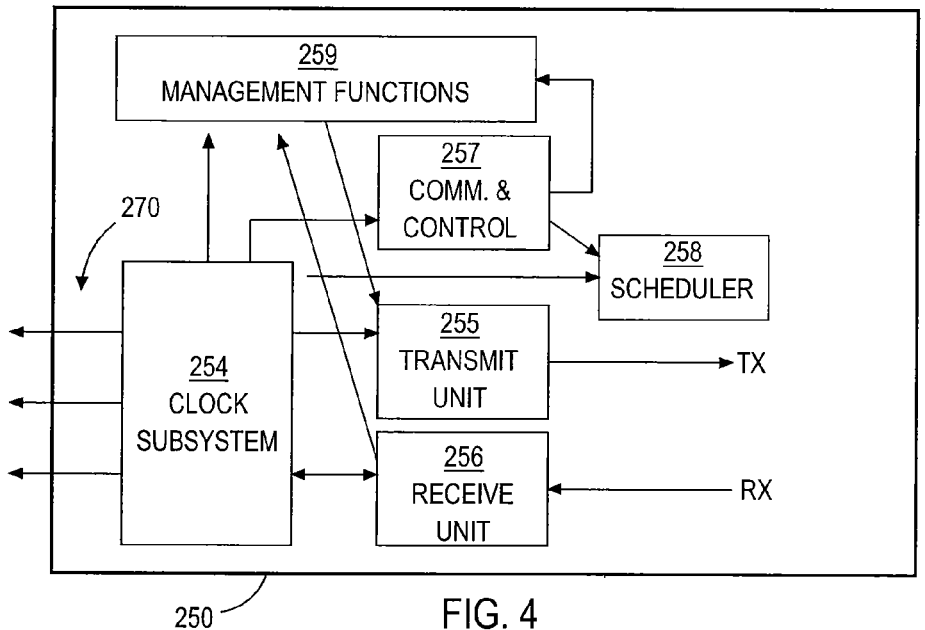
FIG. 4 schematically illustrates the principal components and functions of a client of FIG. 2.

FIG. 4 schematically illustrates the principal components and functions of client 250. Client 250 includes a clock subsystem 254, a transmit unit 255, a receive unit 256, a communication and control module 257, a scheduler module 258, and a management functions module 259. While the components and functionality of client 250 are similar to those of server 210, an important distinction is that client 250 is responsible for generating the various clock signals required for the proper operation of the network element as a telecommunications network device. In the embodiment illustrated in FIGS. 3 and 4, client 250 and server 210 are each embedded in separate network elements. In some embodiments, client 250 and server 210 may share some subcomponents.

Clock subsystem 254 includes the functionality of accepting a time/frequency reference from server 210. Receive unit 256 can extract a clock and/or frequency reference from the physical layer signal, i.e., server-to-client signals 230. In embodiments in which DTI protocol is used, the line-coding scheme for the burst mode communication is based on the Manchester coding technique, which is an isochronous scheme that provides for transitions in every bit-time. Manchester encoding provides a substantial number of edges so that the recovered clock is of exceptionally high quality. The time-of-arrival of the event bit in the burst provides the requisite time-marker for clock subsystem 254 to set its wall-clock, i.e., the values of time as maintained by clock subsystem 254. The payload contains the specific time-of-day, i.e., the wall-clock value, which is appropriate for this event. The clock subsystem will, in general, generate several other clock signals 270 for operating different subsystems within the network element.

Transmit unit 255 generates a transmit signal TX comprising the payload and preamble. Transmit unit 255 accepts the content of payload from communication and control module 257, and the time-of-departure of the transmitted burst is determined by scheduler module 258. In embodiments using the conventional DTI, the time-of-departure is specified in terms of delay from the time-of-arrival of the associated burst at the receive unit. Receive unit 256 recovers a clock reference and/or frequency from the incoming the Manchester-encoded signal and uses the time-of-arrival of the event marker to set the wall-clock of the clock subsystem 254. The payload information is also provided to the communication and control module 257 for parsing and subsequent processing.

Communication and control module 257 represents the functionality related to generating the payload information for transmission and processing of payload information that is received.

Scheduler module 258 is often incorporated inside other blocks in a distributed fashion but is identified separately because of its importance. In the conventional DTI method, which is tailored for use in a network using category 5 cable and having symmetric paths with essentially no transit delay asymmetry, the transmission is based on a fixed delay after receipt of the corresponding burst in the receive unit. However, when applying the DTI in an optical network according to embodiments of the invention, it is possible to enhance the operation of two-way time transfer by suitably choosing the time-of-departure to compensate for a known transit delay asymmetry. Such compensation may be performed by scheduler module 218 as described above by correcting the server output signal, i.e., server-to-client signals 230. Alternatively, compensation for transit delay asymmetry may be addressed by correcting the client output signals, i.e., client-to-server signals 240, and such compensation may be performed by scheduler module 258.

Management functions module 259 includes the traditional OMAP functions associated with telecommunications equipment. This is generally a part of the overall network element but has control and supervision responsibilities for the timing client as well. Specific metrics related to timing can be generated by the management function and delivered to the server 210 as a message in the payload.

Embodiments of the invention are well suited for synchronizing network elements connected by optical fibers to high accuracy and precision. In some embodiments, symmetric paths are established for the "up" and "down" traffic between a network element acting as a server and a network element acting as a client. Thus, there is no asymmetry of delay between the up traffic, i.e., client-to-server signals 240 in FIG. 2, and the down traffic, i.e., server-to-client signals 230. In an exemplary embodiment, the symmetric paths are created between server 210 and client 250 by transmitting server-to-client signals 230 and client-to-server signals 240 using a single frequency of light that is carried over the same optical fiber of physical layer connection 200. In such an embodiment, splitter/combiner modules 213, 253 are configured to provide a splitter/combiner function, so that server-to-client signals 230 are directed from E-O module 211 to O-E module 252 via an optical fiber in physical layer connection 200 during periods of "down" traffic and client-to-server signals 240 are directed from E-O module 251 to O-E module 212 via the same optical fiber during periods of "up" traffic. Consequently, the signal structure of time-transfer traffic between server 210 and client 250 is a ping-pong protocol, since server-to-client signals 230 and client-to-server signals 240 cannot be directed to the appropriate destination simultaneously. Suitable two-way time-transfer protocols include PTP, NTP, and DTI.

Embodiments of the invention contemplate the application of the DTI for time transfer in optical networks, such as network 100, in which symmetric paths are established for time-transfer traffic between server 210 and client 250. Because time delays in an optical network between server 210 and client 250 can be much larger than in a traditional DTI application, in which cable lengths are typically less than 300 meters, a modified application of DTI is provided to avoid issues associated with such long delay times.

Figure 5:
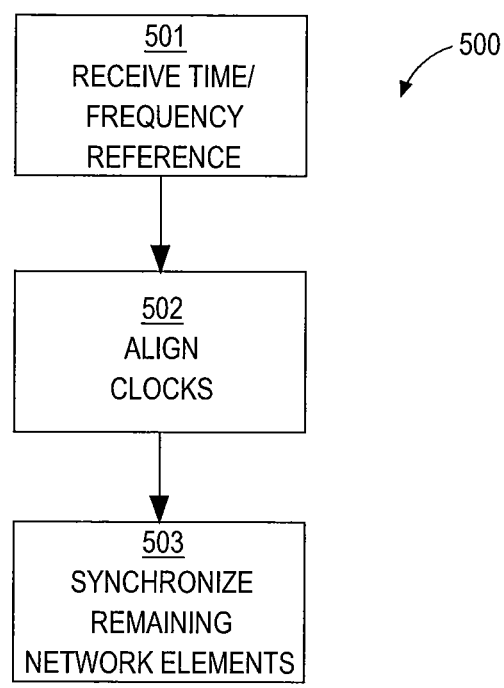
FIG. 5 is a flow chart that summarizes, in a stepwise fashion, a method of precise time-transfer over an optical fiber using symmetric paths and a single light wavelength, according to embodiments of the invention.

FIG. 5 is a flow chart that summarizes, in a stepwise fashion, a method 500 of precise time-transfer over an optical fiber using symmetric paths and a single light wavelength, according to an embodiment of the invention. By way of illustration, method 500 is described in terms of an optical network substantially similar in organization and operation to network 100 in FIG. 1. However, other optical networks may also benefit from the use of method 500. Method 500 may be beneficially invoked at start-up of network 100, after an interruption of service along one or more optical links L1-L17, or if signal degradation along one or more optical links L1-L17 due to burst overlap is detected.

In method 500, each client 250 and server 210 in network elements 101-106 have splitter/combiner modules 213, 253, respectively, configured to selectively direct server-to-client signals 230 from E-O module 211 to O-E module 252 via an optical fiber in physical layer connection 200 and client-to-server signals 240 from E-O module 251 to O-E module 212 via the same optical fiber. Method 500 is a DTI method that has been modified and will be discussed below. Particulars of the standard DTI implementation are described in U.S. Pat. No. 7,535,931, which is incorporated by reference herein.

In step 501, clock subsystem 214 of network element 101 receives time/frequency reference 298 from master timing source 110 and is aligned therewith. In step 502, the network element 101 aligns clock subsystem 254 of network element 102 with clock subsystem 214 of network element 101 via optical link L3. In this step, the server and the client communicate with each other using burst mode communications according to a modified DTI method, which will be described below. Because communication between server 210 and client 250 is over the same medium with the same frequency of light, there is essentially zero asymmetry in transmission time therebetween, and clock subsystem 254 of network element 102 can be precisely aligned with clock subsystem 214 of network element 101 using a standard clock alignment protocol, such as PTP or NTP. In step 503, step 502 is repeated for every remaining network element in network 100. It is noted that steps 501 and 502 do not need to be performed for each and every optical link of optical network 100. When step 503 is completed, all network elements 101-106 are synchronized in time and/or frequency. Method 500 is then repeated periodically in order to maintain the synchronization of network 100.

Figure 6:
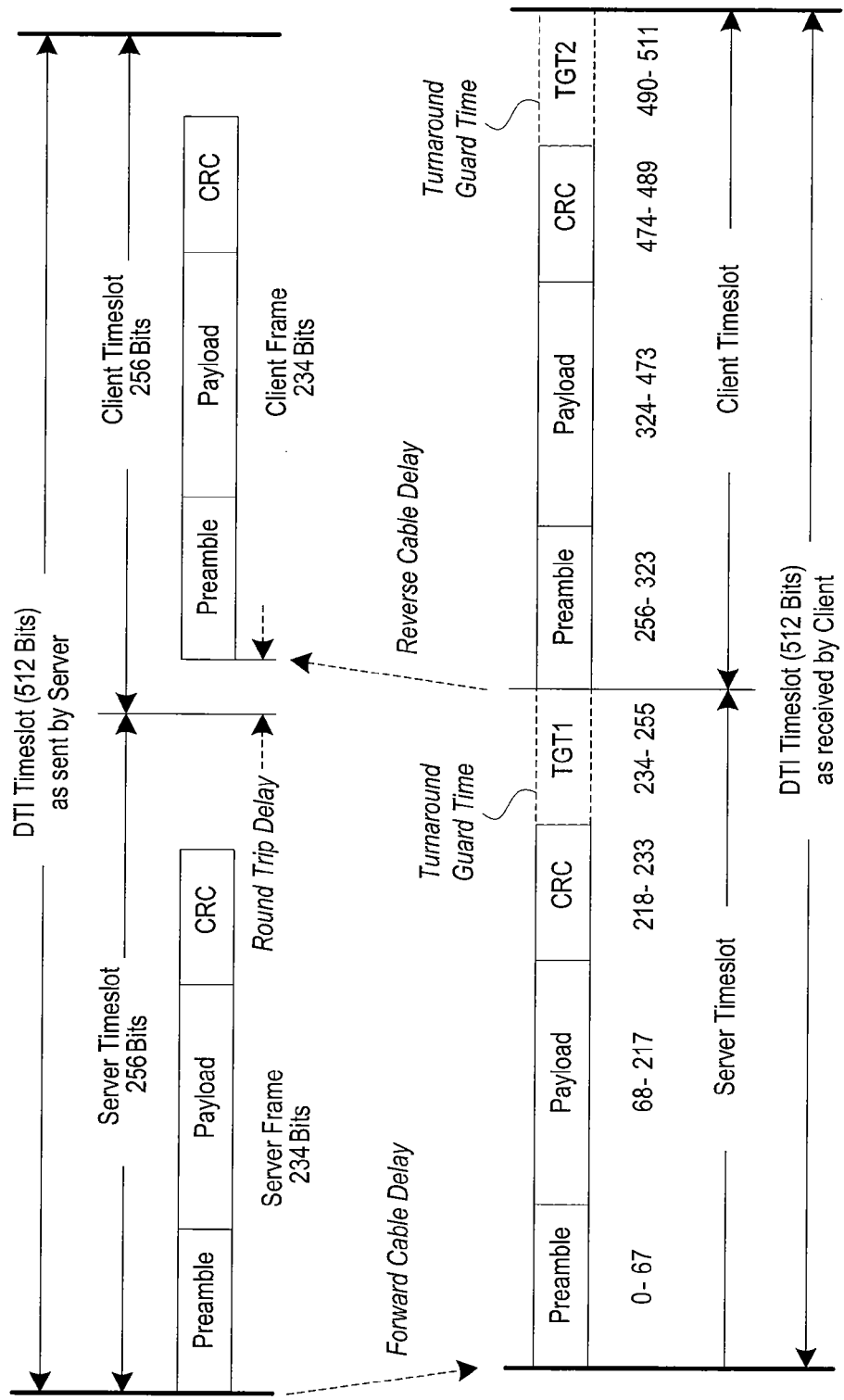
FIG. 6 illustrates components of a sample DTI timeslot.

In the embodiments of the invention to which FIG. 5 applies, the communication between the server and the client is achieved using DTI timeslots. FIG. 6 illustrates components of a sample DTI timeslot. Each DTI timeslot includes a server timeslot and a client timeslot. The start of a DTI timeslot is controlled by the server. At the start of the DTI timeslot, the server sends a burst. Each burst of information includes a preamble, the payload, and a CRC. In response, the client responds with a burst. The client sends its burst after a pre-determined time interval following the end of transmission from the server. In one example, the client initiates transmission after a known time interval following the receipt of an event marker, e.g., the first bit after the preamble in the server burst. A pre-determined turnaround guard time is provided on the client side so that there is never an overlap in time of signals in the two directions. The duration of the DTI timeslot is indicated in FIG. 6 as 256 bits but this number can be adapted to accommodate the flight time over the interconnecting medium between server and client.

According to a first variation of the DTI method, the burst repetition rate is set to a low value, e.g., 100 Hz, in which case the DTI timeslot width is about 10 ms. With such a wide gap, there is little chance of signal overlap in time of server-to-client signals 230 and client-to-server signals 240. The burst repetition rate can be lowered in proportion to the increase in distance between the server and the client.

According to a second variation of the DTI method, the burst repetition rate may or may not be lowered to accommodate the increase in distance between the server and the client. In such situations, the response of the client to a server burst may appear at the server at the current DTI timeslot (for lower burst repetition rates) or subsequent DTI timeslots. In order to align the response of the client to a client timeslot at either the current DTI timeslot (for lower burst repetition rates) or one of the subsequent DTI timeslots (for higher burst repetition rates), an artificial delay of R clock cycles is communicated by the server to the client, and the client adds this to the turn-around delay time. The server uses this value of R in the calculation of effective delay between the server and client. In one implementation of variation of the DTI method, the artificial delay, R, is initially set to 0. The server then iteratively adjusts the value of R and identifies the proper value such that the client burst arrives at the server wholly contained within a client timeslot of the current or subsequent DTI timeslots.

Embodiments of the invention are also well suited for synchronizing network elements connected by optical fibers, in which significant transit delay asymmetry exists for the up and down traffic between a network element acting as a server and a network element acting as a client. Due to such asymmetry, time alignment protocols that have been developed and deployed for short run, category-5-based networks are typically unsuitable for optical networks. This is because the two directions of traffic in optical networks are carried over different fiber strands and/or at different wavelengths and therefore have inherent transit delay asymmetry, and such asymmetry greatly reduces the synchronization accuracy of such time-transfer protocols. Some embodiments of the invention contemplate calculating the transit delay asymmetry of an optical link between a client and a server by determining the index of refraction of the optical path for the two wavelengths of light used to carry up and down traffic over the fiber. The known transit delay asymmetry of the optical link is then compensated for so that time transfer between the server and the client can be accurately performed with known time-transfer protocols.

Figure 7:
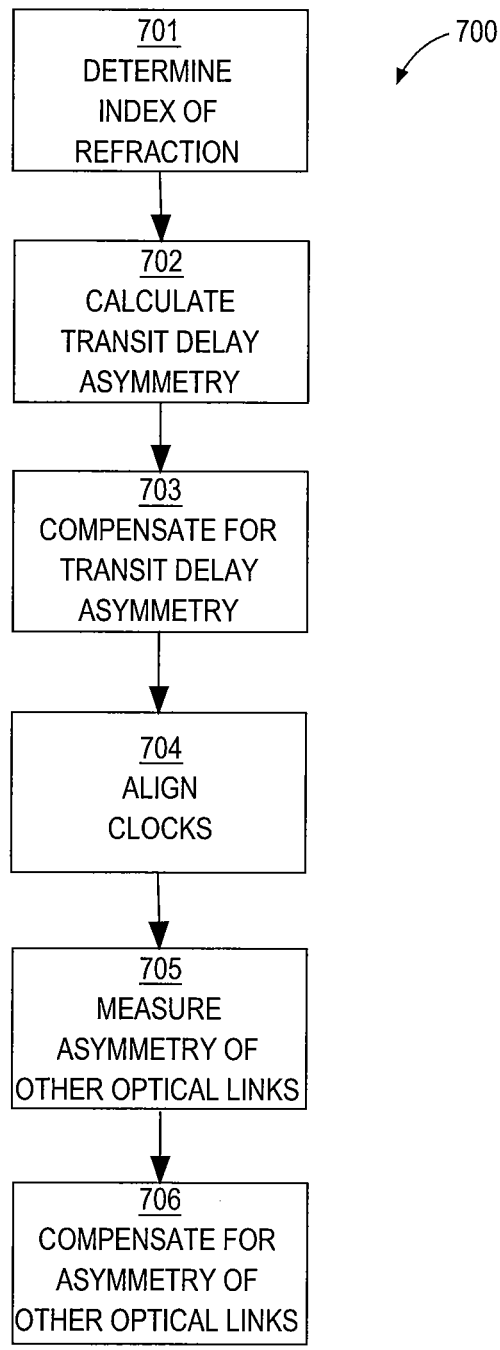
FIG. 7 is a flow chart that summarizes, in a stepwise fashion, a method for precisely synchronizing a client and a server over a single optical fiber, according to embodiments of the invention.

FIG. 7 is a flow chart that summarizes, in a stepwise fashion, a method 700 for precisely synchronizing a client and a server over a single optical fiber, according to embodiments of the invention. By way of illustration, method 700 is described in terms of an optical network substantially similar in organization and operation to network 100 in FIG. 1. However, other optical networks may also benefit from the use of method 700. In method 700, each client 250 and server 210 in network elements 101-106 are coupled via one or more optical links, as shown in FIG. 1. Each optical link includes a single optical fiber, a server wavelength used to carry data traffic from server 210 to client 250 over the optical fiber, i.e., server-to-client signals 230, and a client wavelength used to carry data traffic from client 250 to server 210 over the same optical fiber.

In step 701, the index of refraction of optical link L3 between network element 101 and network element 102 is determined for the server wavelength and for the client wavelength. These indices of refraction can be calculated based on information provided by the manufacturer of the optical fiber and/or directly measured using methods known in the art.

In step 702, the transit delay asymmetry of the optical link between client 210 and server 250 is calculated. Such a calculation is straight-forward, since a simple relationship exists between the delays at the two wavelengths: the transit delay over the same fiber strand at different wavelengths is proportional to a constant value that is derived from the index of refraction of the glass fiber at the two wavelengths.

In step 703, the transit delay asymmetry calculated in step 702 is compensated for by server 210 so that time transfer between the server and the client is accurate. Specifically, scheduler module 218 of server 210, which controls the time-of-departure of time-transfer bursts, may perform this function. For example, scheduler module 218 may advance the time stamp from the actual time a TX burst leaves server 210, where the amount the time stamp is advanced is based on the transit delay asymmetry measured between server 210 and client 250. As noted above in conjunction with FIG. 4, compensation for transit delay asymmetry may be addressed by correcting the client output signals, i.e., client-to-server signals 240, and such compensation may be performed by scheduler module 258.

In step 704, clock subsystem 214 of server 210 and clock subsystem 254 of client 250 are precisely aligned to each other using a two-way time-transfer protocol, such as PTP, NTP, or DTI. In one embodiment, DTI is used as the synchronization standard for aligning clock subsystem 214 and clock subsystem 254. Because the transit delay asymmetry is compensated for as described in step 703, and because DTI is a very precise synchronization standard, accuracy of the alignment of clock subsystem 214 and clock subsystem 254 has been demonstrated by the inventors to be on the sub-nanosecond scale. In some embodiments, prior to step 704 an artificial delay of R clock cycles is added to a client turn-around delay time in order to align the response of the client to a client timeslot at either the current DTI timeslot (for lower burst repetition rates) or one of the subsequent DTI timeslots (for higher burst repetition rates), as described above. Thus, a higher rate of time transfer between server 210 and client 250 during steps 704 and 705 may be established.

In step 705, the transit delay asymmetry of other optical links between network elements 101 and 102, such as optical link L4, is measured. With clock subsystem 214 and clock subsystem 254 precisely aligned in step 704, the transit delay asymmetry of other optical links between network elements 101 and 102 can be measured directly. It is noted that only two optical links are shown coupling network elements 101 and 102. In practice, more than two optical links may couple any pair of network elements of network 100.

In step 706, the transit delay asymmetry of other optical links between network elements 101 and 102, such as optical link L4, is compensated for based on the transit delay asymmetry measured in step 705. In this way, the optical links between network elements 101 and 102 are synchronized.

Some embodiments of the invention contemplate calculating the transit delay asymmetry of an optical link between a client and a server by coupling a DTI time source to the client and another DTI time source to the server. Because each DTI time source can be considered a master timing source, once the clock of the client and server are both aligned with the DTI time sources coupled thereto, the client and the server may be considered to be precisely aligned with each other.

Figure 8:
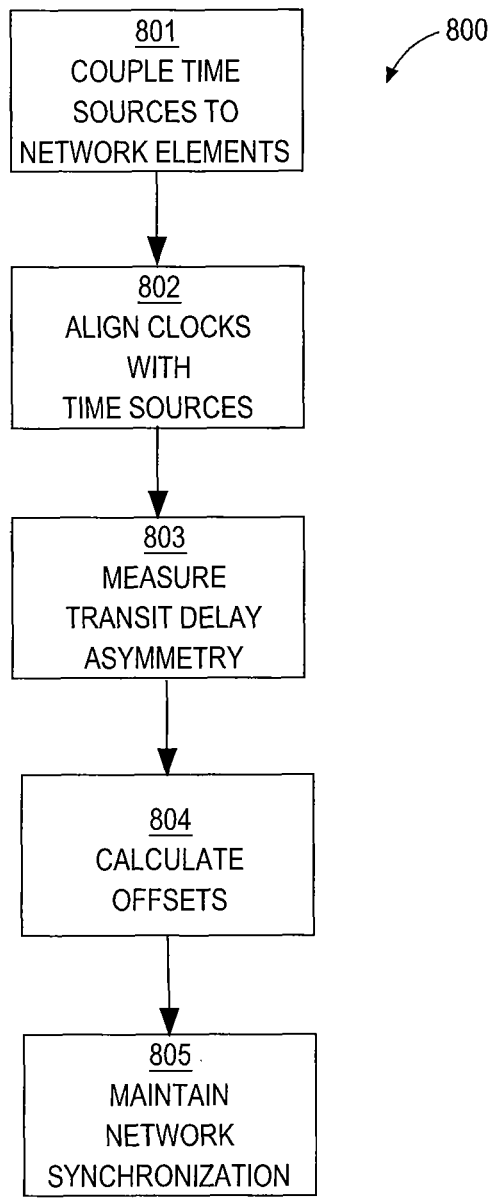
FIG. 8 is a flow chart that summarizes, in a stepwise fashion, a method for precisely synchronizing a client and a server and determining transit delay asymmetry of optical links coupling the client and the server, according to embodiments of the invention.

FIG. 8 is a flow chart that summarizes, in a stepwise fashion, a method 800 for precisely synchronizing a client and a server and determining transit delay asymmetry of optical links coupling the client and the server, according to embodiments of the invention. By way of illustration, method 800 is described in terms of an optical network substantially similar in organization and operation to network 100 in FIG. 1. However, other optical networks may also benefit from the use of method 800. In method 800, network element 101-106 are coupled via one or more optical links, a shown in FIG. 1 and are configured with a physical connection or port to allow coupling to a DTI time source.

In step 801, a DTI time source is coupled to network element 101 and network element 102.

In step 802, clock subsystem 214 is aligned with the DTI time source coupled to network element 101 and clock subsystem 254 is aligned with the DTI time source coupled to network element 102.

In step 803, the transit delay asymmetry for optical links L3 and L4 is directly measured. Because clock subsystem 214 of network element 101 and clock subsystem 254 network element 102 are both aligned with a DTI time source, the transit delay asymmetry for each optical link between network elements 101 and 102 can be measured directly. Alternatively, in step 803 the transit delay asymmetry for a single optical link, e.g., optical link L3, is measured directly, and transit delay asymmetry between other optical links between network element 101 and 102, e.g., optical link L4, can be calculated.

In step 804, time-of-departure offsets are calculated for each optical link between network elements 101 and 102, i.e., optical links L3 and L4, that compensate for the transit delay asymmetry measured for each link in step 803. The calculated offsets are then stored in memory accessible to server 210 of network elements 101 and 102.

In step 805, a two-way time-transfer protocol is used to maintain time and/or frequency synchronization between network elements 101, 102 during normal operation of network 101. Because the servers of network elements 101, 102 have the time-of-departure offsets available for optical links L3 and L4, the DTI time sources coupled to network elements 101, 102 may be removed without affecting the precision of time transfer therebetween via optical links L3 or L4. The two-way time-transfer protocol may be a time-transfer protocol that assumes zero transit delay asymmetry for links L3 and L4 because such asymmetry is compensated for by the time-of-departure offsets calculated in step 804.

Once the transit delay asymmetry (A) is determined in accordance with the method of FIG. 7, the error in the client clock (error), the actual server-to-client transit delay (TSC), and the actual client-to-server transit delay (TCS) can be measured based on the following equations:

$$t4 = t3 + \text{error} + TCS$$

$$t1 = t2 + \text{error} - TSC$$

$$A = (TSC - TCS)/2$$

where t1 is the server transmit time stamp, t2 the client receive time stamp, t3 the client transmit time stamp, and t4 the server receive time stamp.

Once the clocks are aligned in accordance with the method of FIG. 7, the asymmetry (A') of the other optical links can be measured based on the following equations:

$$t4 = t3 + TCS$$

$$t1 = t2 - TSC$$

$$A' = (TSC - TCS)/2$$

where t1 is the server transmit time stamp, t2 the client receive time stamp, t3 the client transmit time stamp, and t4 the server receive time stamp.

Once the clocks are aligned in accordance with the method of FIG. 8, the transit delay TSC, transit delay TCS, and asymmetry A can be measured based on the following equations:

$$t4 = t3 + TCS$$

$$t1 = t2 - TSC$$

$$A = (TSC - TCS)/2$$

where t1 is the server transmit time stamp, t2 the client receive time stamp, t3 the client transmit time stamp, and t4 the server receive time stamp.

While embodiments of the present invention are described in terms of Ethernet technologies, persons skilled in the art will recognize that this invention may be implemented using any technically feasible physical link layer technology without departing the scope of this invention.

In the preceding description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

We claim:

1. A method of synchronizing a clock at a client that is connected to a server through an optical fiber link, said method comprising the steps of:
    transmitting bursts of timing information from the server to the client;
    at the client, upon receiving each burst from the server, transmitting a burst response after a predetermined turnaround guard time has elapsed since receipt of the server burst; and
    aligning the clock based on timing information contained in the server bursts and the burst responses,
    wherein the bursts from the server to the client and the burst responses from the client to the server are transmitted over the same wavelength channel of the optical fiber link.

2. The method of claim 1, further comprising the step of:
    determining a rate at which the bursts of timing information are transmitted from the server to the client based on a distance between the server and the client,
    wherein the bursts of timing information are transmitted from the server to the client at the determined rate.

3. The method of claim 1, wherein the step of aligning includes frequency alignment.

4. The method of claim 1, wherein the step of aligning includes frequency alignment and time alignment.

5. The method of claim 4, wherein the client and the server are connected over one or more additional links, and transit delays between the client and the server over the additional links are determined in both directions using the aligned clock.

6. The method of claim 1, wherein a burst is transmitted by the server to the client only after a response burst transmitted by the client in response to a prior burst transmitted by the server to the client, has been received at the server.

7. The method of claim 1, wherein a burst is transmitted by the server to the client before a response burst transmitted by the client in response to a prior burst transmitted by the server to the client, has been received at the server.

8. The method of claim 1, wherein a burst repetition rate at which the bursts from the server to the client are transmitted is lowered in proportion to an increase in distance between the server and the client.

9. The method of claim 1, further comprising:
    transmitting an artificial delay from the server to the client; and
    adding the artificial delay to the turnaround guard time.

10. A method of synchronizing a clock at a client that is connected to a server through an optical fiber link, said method comprising the steps of:
    transmitting bursts of timing information from the server to the client over a first wavelength channel of the optical fiber link;
    at the client, upon receiving each burst from the server, transmitting a burst response over the first wavelength channel of the optical fiber link;
    calculating a transit delay in the first wavelength channel based on timing information contained in the server bursts and the burst responses;
    transmitting bursts of timing information from the server to the client over a second wavelength channel of the optical fiber link;
    at the client, upon receiving each burst from the server, transmitting a burst response over the second wavelength channel of the optical fiber link;
    calculating a transit delay in the second wavelength channel based on timing information contained in the server bursts and the burst responses;
    transmitting bursts of timing information from the server to the client, wherein the bursts from the server to the client are transmitted over the first wavelength channel of the optical fiber link; and
    at the client, upon receiving each burst from the server, transmitting a burst response after a predetermined turnaround guard time has elapsed since receipt of the server burst, wherein the burst responses from the client to the server is transmitted over the second wavelength channel of the optical fiber link that is different from the first wavelength channel; and
    aligning the clock based on timing information contained in the server bursts and the burst responses, and differences in the transit delays of the first and second wavelength channels.

11. The method of claim 10, further comprising the step of:
    determining a rate at which the bursts of timing information are transmitted from the server to the client based on a distance between the server and the client,
    wherein the bursts of timing information are transmitted from the server to the client at the determined rate.

12. The method of claim 10, wherein the step of aligning includes frequency alignment.

13. The method of claim 10, wherein the step of aligning includes frequency alignment and time alignment.

14. The method of claim 13, wherein the client and the server are connected over one or more additional links, and transit delays between the client and the server over the additional links are determined in both directions using the aligned clock.

15. The method of claim 10, wherein a burst is transmitted by the server to the client only after a response burst transmitted by the client in response to a prior burst transmitted by the server to the client, has been received at the server.

16. The method of claim 10, wherein a burst is transmitted by the server to the client before a response burst transmitted by the client in response to a prior burst transmitted by the server to the client, has been received at the server.

17. A method of determining transit delays through an optical fiber link that connects a client and a server, said method comprising the steps of:
    determining an asymmetry in the transit delays through the optical fiber link using a DOCSIS Timing Interface (DTI) synchronization method, wherein the determining includes, at the client, receiving bursts of timing information from the server and transmitting, for each of the received bursts, a burst response after a turnaround guard time has elapsed since receipt of the server burst;
    transmitting timing information between the server and the client; and
    determining a transit delay between the server and the client based on the transmitted timing information and the determined asymmetry.

18. The method of claim 17, wherein the step of determining the asymmetry includes the steps of correcting a client clock with an accurate timing reference, and correcting a server clock with an accurate timing reference, wherein the asymmetry is determined using the corrected clocks.

19. The method of claim 17, wherein the timing information is transmitted from the server to the client along a first wavelength channel and from the client to the server along a second wavelength channel, wherein the asymmetry is determined based on differences in the transit delays of the first and second wavelength channels.

20. The method of claim 17, wherein the transit delay from the server to the client is determined.

21. The method of claim 17, wherein the transit delay from the client to the server is determined.

22. The method of claim 17, wherein the transmitted timing information includes a server transmit time stamp, a client receive time stamp, a client transmit time stamp, and a server receive time stamp.

23. The method of claim 17, wherein the asymmetry is determined for a single path connecting the server and the client and stored, and a client clock uses the stored asymmetry to precisely align to a server clock in accordance with a standard non-asymmetry correcting time transfer protocol that is run over said single path.

24. The method of claim 23, further comprising the step of measuring asymmetry in other paths between the server and the client using the aligned client clock and by running a standard non-asymmetry correcting time transfer protocol on said other paths.

25. A method of measuring a transit delay between a client that is connected to a server over a wavelength channel of an optical fiber link, said method comprising the steps of:
  transmitting bursts of timing information from the server to the client;
  at the client, upon receiving each burst from the server, transmitting a burst response after a predetermined turn-around guard time has elapsed since receipt of the server burst, wherein the bursts from the server to the client and the burst responses from the client to the server are transmitted over the same wavelength channel of the optical fiber link;
  measuring a round-trip delay between the server and the client using the server bursts and the burst responses; and
  calculating the transit delay between the server and the client as one-half the round-trip delay.

\* \* \* \* \*